US008840062B2

(12) United States Patent
Smith et al.

(10) Patent No.: US 8,840,062 B2
(45) Date of Patent: Sep. 23, 2014

(54) PYLON MOUNTING SYSTEM WITH VIBRATION ISOLATION

(75) Inventors: Michael R. Smith, Colleyville, TX (US); Steven Spears, Hurst, TX (US); Frank B. Stamps, Colleyville, TX (US); Michael S. Seifert, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 77 days.

(21) Appl. No.: 13/699,769

(22) PCT Filed: Apr. 11, 2011

(86) PCT No.: PCT/US2011/031888
§ 371 (c)(1),
(2), (4) Date: Nov. 26, 2012

(87) PCT Pub. No.: WO2012/141676
PCT Pub. Date: Oct. 18, 2012

(65) Prior Publication Data
US 2013/0105621 A1 May 2, 2013

(51) Int. Cl.
*B64D 27/00* (2006.01)
*B64C 27/00* (2006.01)
*F16F 13/08* (2006.01)
*F16F 13/24* (2006.01)

(52) U.S. Cl.
CPC ......... *B64C 27/001* (2013.01); *B64C 2027/002* (2013.01); *F16F 13/08* (2013.01); *F16F 13/24* (2013.01)
USPC ...................... 244/54; 267/64.11; 267/140.11

(58) Field of Classification Search
USPC .................. 244/54; 188/378, 379; 267/64.11, 267/140.11, 113
See application file for complete search history.

(56) References Cited

U.S. PATENT DOCUMENTS

| 4,236,607 | A | 12/1980 | Halwes et al. |
|---|---|---|---|
| 5,180,145 | A | 1/1993 | Watanabe et al. |
| 5,435,531 | A | 7/1995 | Smith et al. |
| 6,009,983 | A * | 1/2000 | Stamps et al. ............... 188/298 |
| 6,217,011 | B1 * | 4/2001 | Redinger ................ 267/140.11 |
| 6,431,530 | B1 * | 8/2002 | Stamps et al. .............. 267/136 |
| 6,695,106 | B2 | 2/2004 | Smith et al. |
| 2006/0261530 | A1 | 11/2006 | Stamps et al. |
| 2010/0301160 | A1 | 12/2010 | Ward et al. |
| 2011/0027083 | A1 | 2/2011 | Stamps et al. |
| 2013/0270415 | A1 * | 10/2013 | Lee et al. .................... 248/638 |

OTHER PUBLICATIONS

International Search Report and the Written Opinion of the International Searching Authority mailed by ISA/USA, U.S. Patent and Trademark Office on Jun. 21, 2011 for International Patent Application No. PCT/US11/31888, 10 pages.
Extended European Search Report issued from the European Patent Office from corresponding application No. 11863444.3 dated May 8, 2014.

* cited by examiner

*Primary Examiner* — Christopher P Ellis
(74) *Attorney, Agent, or Firm* — James E. Walton; Brian E. Harris

(57) ABSTRACT

A pylon mounting system with vibration isolation is provided. The system generally includes a housing that defines a first fluid chamber and a second fluid chamber, a fluid disposed within the fluid chambers; a piston assembly at least partially disposed within the housing, and a tuning passage defined by the piston assembly for providing fluid communication between the fluid chambers. The piston assembly has a first arm and a second arm, and each arm has a tubeform bearing for providing pitch and roll stiffness.

16 Claims, 3 Drawing Sheets

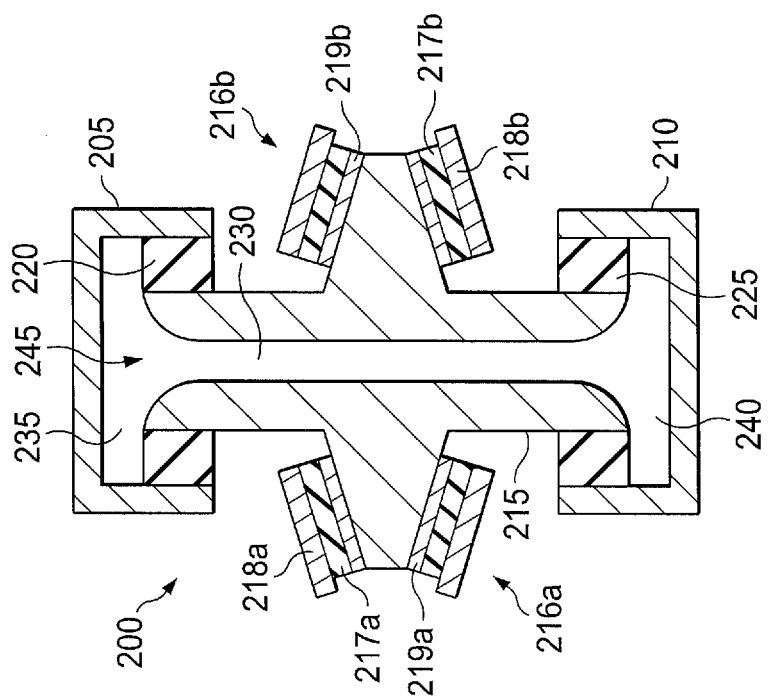

PYLON MOUNTING SYSTEM WITH VIBRATION ISOLATION

TECHNICAL FIELD

The present application relates in general to heaver-than-air aircraft. More specifically, the present application relates to a pylon mounting system with vibration isolation.

DESCRIPTION OF THE PRIOR ART

One important engineering objective during the design of an aircraft is to minimize the weight and number of parts. It is especially important in the design and manufacture of helicopters and other rotary wing aircraft, such as tilt rotor aircraft, which are required to hover against the dead weight of the aircraft, and which are, thus, somewhat constrained in their payload in comparison with fixed-wing aircraft.

Methods and devices for isolating a vibrating body from another body are useful in a variety of technical fields and applications. Such isolators are particularly useful for isolating an aircraft frame from mechanical vibrations, which may be caused by other aircraft components. For example, the engine and transmission often generate unwanted vibrations that can be isolated from the aircraft frame by an isolator, such as a liquid inertia vibration elimination (LIVE) system. However, vibration isolators also add weight and complexity to an aircraft. Accordingly, the design and use of vibration isolators continues to present significant challenges to engineers and manufacturers.

BRIEF DESCRIPTION OF THE DRAWINGS

The novel features believed characteristic and novel of a pylon mounting system according to this specification are set forth in the appended claims. However, the system, as well as a preferred mode of use, and further objectives and advantages thereof, will best be understood by reference to the following detailed description when read in conjunction with the accompanying drawings, wherein:

FIG. 2 is a cross-sectional view of a vibration isolator according to one embodiment of the present specification;

FIG. 3 is a cross-sectional view of a vibration isolator according to another embodiment of the present specification.

DESCRIPTION OF THE PREFERRED EMBODIMENT

Illustrative embodiments of the novel system are described below. In the interest of clarity, not all features of such embodiments may be described. It should be appreciated that in the development of any such system, numerous implementation-specific decisions must be made to achieve specific goals, such as compliance with system-related and business-related constraints, which will vary from one implementation to another. Moreover, it should be appreciated that such decisions might be complex and time-consuming, but would nevertheless be a routine undertaking for those of ordinary skill in the art having the benefit of this specification.

Reference may be made to the spatial relationships between various components and to the spatial orientation of various aspects of components as the system is depicted in the attached drawings. However, as should be recognized by those skilled in the art, the elements, members, components, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the example embodiments described herein may be oriented in any desired direction.

Figure 1:
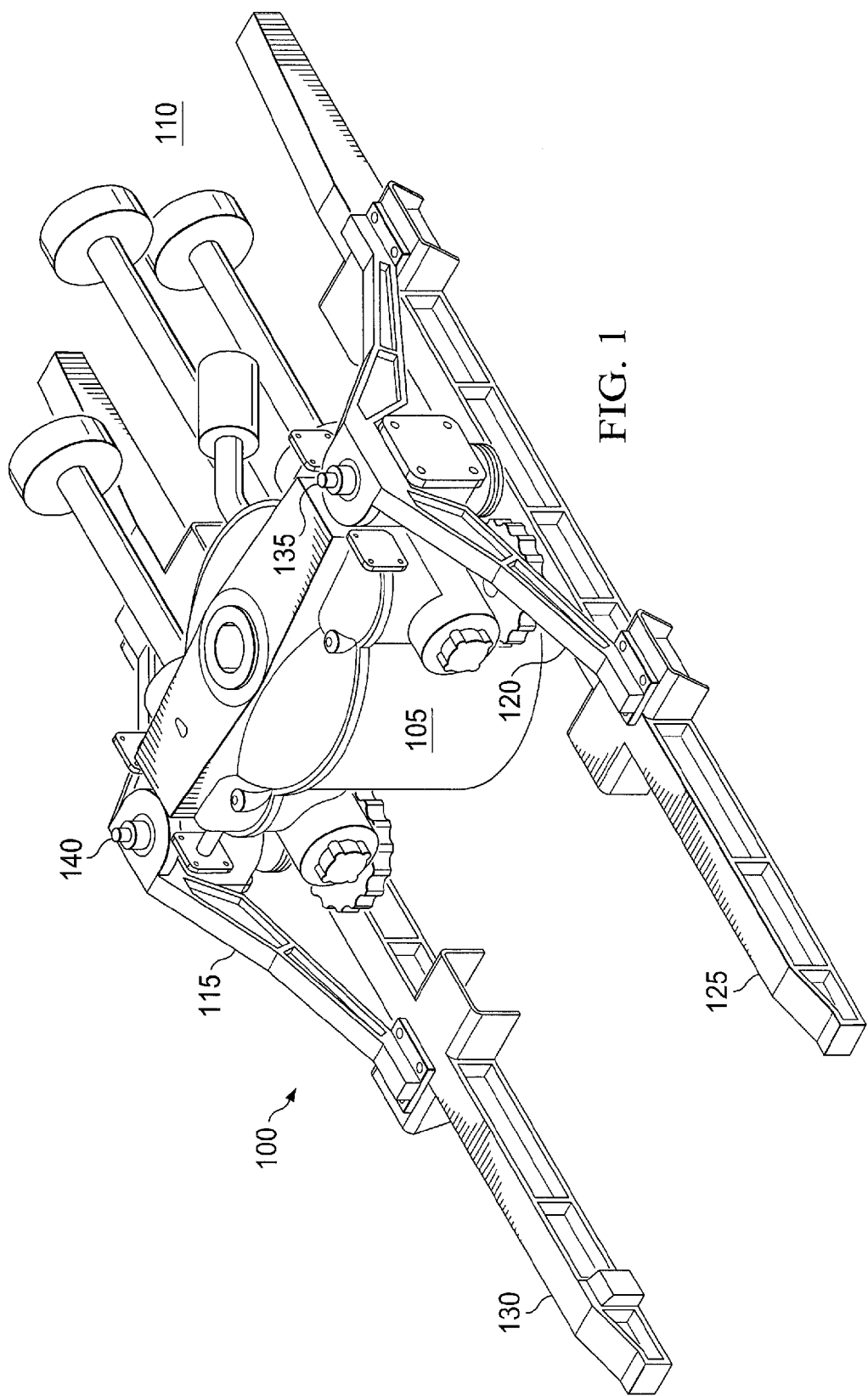
FIG. 1 is a perspective view of a pylon mounting system according to one embodiment of the present specification.

Referring to the appended drawings, FIG. 1 is a perspective view of one embodiment of a rotor pylon 100 according to the present specification, which may be used to mount a rotor assembly to an aircraft. A transmission 105 transmits power from a power plant 110, such as a jet turbine engine, to a rotor assembly (not shown) to provide lift and propulsion for the aircraft. Transmission 105 is connected to pylons 115 and 120, which extend upwardly from roof beams 125 and 130. Vibrations isolators may be provided to minimize the transfer of vibrations from the transmission 105 and other components to the rest of the aircraft. In the embodiment illustrated in FIG. 1, vibration isolators 135 and 140 according to the present specification are connected between transmission 105 and pylons 115 and 120, respectively.

FIG. 2 is a cross-sectional view of an embodiment of a vibration isolator 200 according to the present specification. Vibration isolator 200 comprises an upper housing 205 and a lower housing 210. A piston 215 is at least partially disposed within the interior of upper housing 205 and lower housing 210. Piston 215 includes arms 216a and 216b. Arms 216a and 216b have a conical profile in FIG. 2, but other profiles, such as a cylindrical profile, may be acceptable or preferable in other embodiments. Tubeform bearings 217a and 217b are bonded to arms 216a and 216b, respectively, and may include casing 218a and 218b. Bearings 217a and 217b are preferably high-capacity laminate (HCL) elastomeric bearings. The casings 218a and 218b may be open-ended or closed. Shims 219a and 219b may also be disposed between bearings 217a and 217b, respectively, as needed for proper orientation. An upper elastomeric member 220 seals and resiliently locates piston 215 within the interior of upper housing 205. Similarly, a lower elastomeric member 225 seals and resiliently locates piston 215 within the interior of lower housing 210. Elastomeric members 220 and 225 may function as a spring to permit piston 215 to move or oscillate relative to upper housing 205 and lower housing 210. When no load is applied, elastomeric members 220 and 225 are configured to locate piston 215 generally central to upper housing 205 and lower housing 210. The interior of piston 215 defines a generally elongated tuning passage 230. An upper fluid chamber 235 is generally defined by the interior of upper housing 205, piston 215, and upper elastomeric member 220. Similarly, a lower fluid chamber 240 is generally defined by the interior of lower housing 210, piston 215, and lower elastomeric member 225.

Tuning passage 230 extends centrally through a longitudinal axis of piston 215, so that upper fluid chamber 235 and lower fluid chamber 240 are in fluid communication. A tuning fluid 245 is disposed in upper fluid chamber 235, lower fluid chamber 240, and tuning passage 230. Tuning fluid 245 preferably has low viscosity, relatively high density, and non-corrosive properties. For example, tuning fluid 245 may be mercury or a proprietary fluid, such as SPF I manufactured by LORD CORPORATION. Other embodiments may incorporate hydraulic fluid having suspended dense particulate matter.

In operation, piston 215 is typically coupled to a vibrating body. For example, an aircraft transmission may be mounted to arms 216a and 216b. Arms 216a and 216b may be oriented substantially perpendicular to the pitch axis, such that the torsional shearing of bearings 217a and 217b provide roll stiffness and the vertical stiffness of bearings 217a and 217b provide pitch stiffness without the need for additional pitch restraints. Upper housing 205 and lower housing 210 are typically coupled to a body to be isolated from vibration, such as a roof structure (not shown) of an aircraft. In such an arrangement, the aircraft structure is the body to be isolated from vibration, and the transmission is the vibrating body. Introduction of an axial force into piston 215, such as from transmission vibrations, translates piston 215 axially relative to upper housing 205 and lower housing 210. The movement of piston 215 forces tuning fluid 245 to move through tuning passage 230 in a direction opposite to the translation direction of piston 215. Movement of tuning fluid 245 produces an inertial force that substantially reduces, or isolates, the force from piston 215 at a discrete frequency, i.e., the isolation frequency.

FIG. 3 is a cross-sectional view of another embodiment of a vibration isolator 300 according to the present specification. Vibration isolator 300 comprises an upper housing 305 and a lower housing 310. A piston 315 is at least partially disposed within the interior of upper housing 305 and lower housing 310. Piston 315 includes arms 316a and 316b. Arms 316a and 316b have a conical profile in FIG. 3, but other profiles, such as a cylindrical profile, may be preferable in other embodiments. Arms 316a and 316b have a generally hollow interior. Tubeform bearings 317a and 317b are bonded to arms 316a and 316b, respectively, and may include casing 318a and 318b, which may cap arms 316a and 316b, respectively. Bearings 317a and 317b are preferably high-capacity laminate (HCL) elastomeric bearings. Shims 319a and 319b may also be disposed between bearings 317a and 317b, respectively, as needed for proper orientation. An upper elastomeric member 320 seals and resiliently locates piston 315 within the interior of upper housing 305. Similarly, a lower elastomeric member 325 seals and resiliently locates piston 315 within the interior of lower housing 310. Elastomeric members 320 and 325 may function as a spring to permit piston 315 to move or oscillate relative to upper housing 305 and lower housing 310. When no load is applied, elastomeric members 320 and 325 are configured to locate piston 315 generally central to upper housing 305 and lower housing 310. The interior of piston 315 defines a generally elongated tuning passage 330. An upper fluid chamber 335 is generally defined by the interior of upper housing 305, piston 315, and upper elastomeric member 320. Similarly, a lower fluid chamber 340 is generally defined by the interior of lower housing 310, piston 315, and lower elastomeric member 325.

Tuning passage 330 extends centrally through a longitudinal axis of piston 315, so that upper fluid chamber 335 and lower fluid chamber 340 are in fluid communication. A tuning fluid 345 is disposed in upper fluid chamber 335, lower fluid chamber 340, and tuning passage 330. Tuning fluid 345 preferably has low viscosity, relatively high density, and non-corrosive properties. For example, tuning fluid 345 may be mercury or a proprietary fluid, such as SPF I manufactured by LORD CORPORATION. Other embodiments may incorporate hydraulic fluid having suspended dense particulate matter.

In operation, piston 315 is typically coupled to a vibrating body. For example, an aircraft transmission may be mounted to arms 316a and 316b. Arms 316a and 316b may be oriented substantially perpendicular to the pitch axis, such that the torsional shearing of bearings 317a and 317b provide roll stiffness and the vertical stiffness of bearings 317a and 317b provide pitch stiffness without the need for additional pitch restraints. Upper housing 305 and lower housing 310 are typically coupled to a body to be isolated from vibration, such as a roof structure (not shown) of an aircraft. In such an arrangement, the aircraft structure is the body to be isolated from vibration, and the transmission is the vibrating body. Introduction of an axial force into piston 315, such as from transmission vibrations, translates piston 315 axially relative to upper housing 305 and lower housing 310. The movement of piston 315 forces tuning fluid 345 to move through tuning passage 330 in a direction opposite to the translation direction of piston 315. Movement of tuning fluid 345 produces an inertial force that substantially reduces, or isolates, the force from piston 315 at a discrete frequency, i.e., the isolation frequency.

Figure 4:
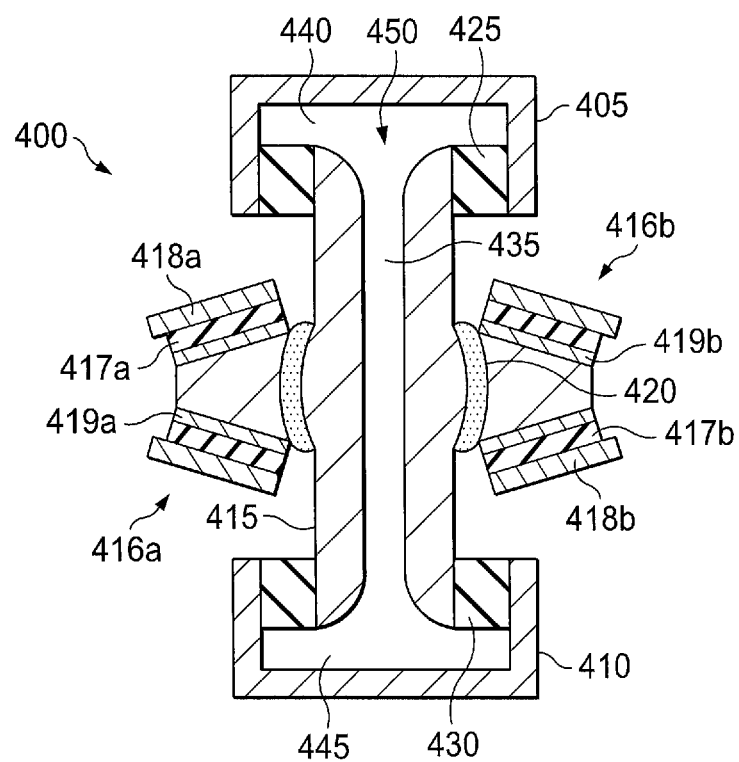
FIG. 4 is a cross-sectional view of a vibration isolator according to a third embodiment of the present specification

FIG. 4 is a cross-sectional view of yet another embodiment of a vibration isolator 400 according to the present specification. Vibration isolator 400 comprises an upper housing 405 and a lower housing 410. A piston 415 is at least partially disposed within the interior of upper housing 405 and lower housing 410. Piston 415 includes arms 416a and 416b. Arms 416a and 416b have a conical profile in FIG. 4, but other profiles, such as a cylindrical profile, may be preferable in other embodiments. Arms 416a and 416b have a generally hollow interior. Tubeform bearings 417a and 417b are bonded to arms 416a and 416b, respectively, and may include casing 418a and 418b, which may cap arms 416a and 416b, respectively. Bearings 417a and 417b are preferably high-capacity laminate (HCL) elastomeric bearings. Shims 419a and 419b may also be disposed between bearings 417a and 417b, respectively, as needed for proper orientation. Additionally, a spherical elastomeric bearing 420 is bonded to piston 415. An upper elastomeric member 425 seals and resiliently locates piston 415 within the interior of upper housing 405. Similarly, a lower elastomeric member 430 seals and resiliently locates piston 415 within the interior of lower housing 410. Elastomeric members 425 and 430 may function as a spring to permit piston 415 to move or oscillate relative to upper housing 405 and lower housing 410. When no load is applied, elastomeric members 425 and 430 are configured to locate piston 415 generally central to upper housing 405 and lower housing 410. The interior of piston 415 defines a generally elongated tuning passage 435. An upper fluid chamber 440 is generally defined by the interior of upper housing 405, piston 415, and upper elastomeric member 425. Similarly, a lower fluid chamber 445 is generally defined by the interior of lower housing 410, piston 415, and lower elastomeric member 430.

Tuning passage 435 extends centrally through a longitudinal axis of piston 415, so that upper fluid chamber 440 and lower fluid chamber 445 are in fluid communication. A tuning fluid 450 is disposed in upper fluid chamber 440, lower fluid chamber 445, and tuning passage 435. Tuning fluid 450 preferably has low viscosity, relatively high density, and non-corrosive properties. For example, tuning fluid 450 may be mercury or a proprietary fluid, such as SPF I manufactured by LORD CORPORATION. Other embodiments may incorporate hydraulic fluid having suspended dense particulate matter.

In operation, piston 415 is typically coupled to a vibrating body. For example, an aircraft transmission may be mounted to arms 416a and 416b. Arms 416a and 416b may be oriented substantially perpendicular to the pitch axis, such that the torsional shearing of bearings 417a and 417b provide roll stiffness. Spherical elastomeric bearing 420 and the vertical stiffness of bearings 417a and 417b provide pitch stiffness without the need for additional pitch restraints. Upper housing 405 and lower housing 410 are typically coupled to a body to be isolated from vibration, such as a roof structure (not shown) of an aircraft. In such an arrangement, the aircraft structure is the body to be isolated from vibration, and the transmission is the vibrating body. Introduction of an axial force into piston 415, such as from transmission vibrations, translates piston 415 axially relative to upper housing 405 and lower housing 410. The movement of piston 415 forces tuning fluid 450 to move through tuning passage 435 in a direction opposite to the translation direction of piston 415. Movement of tuning fluid 450 produces an inertial force that substantially reduces, or isolates, the force from piston 415 at a discrete frequency, i.e., the isolation frequency.

Certain example embodiments have been shown in the drawings and described above, but variations in these embodiments will be apparent to those skilled in the art. The principles disclosed herein are readily applicable to a variety of mechanical systems, including many types of aircraft. The preceding description is for illustration purposes only, and the claims below should not be construed as limited to the specific embodiments shown and described.

The invention claimed is:

1. A vibration isolator, comprising:
   a housing;
   a piston assembly at least partially disposed within the housing, the piston assembly having a first arm and a second arm;
   a first fluid chamber between the housing and a first end of the piston assembly;
   a second fluid chamber between the housing and a second end of the piston assembly;
   a tuning passage for providing fluid communication between the first fluid chamber and the second fluid chamber, the tuning passage defining a longitudinal axis; and
   a first tubeform bearing concentrically bonded to the first arm and a second tubeform bearing concentrically bonded to the second arm, the first arm and the second arm having a conical profile to provide elastomeric stiffness in the longitudinal direction, thereby providing stiffness to counter drive torque wind-up due to rotor assembly rotational drag and inertia.

2. The vibration isolator according to claim 1, wherein the first tubeform bearing and the second tubeform bearing each comprises:
   an elastomeric bearing; and
   a casing bonded to the elastomeric bearing.

3. The vibration isolator according to claim 1, wherein the first tubeform bearing and the second tubeform bearing each comprises:
   a high capacity laminate elastomeric bearing; and
   a casing bonded to the high capacity laminate elastomeric bearing.

4. The vibration isolator according to claim 1, wherein the piston assembly is resiliently coupled to the housing with at least one elastomer member.

5. The vibration isolator according to claim 1, wherein each of the first arm and the second arm is at least partially hollow.

6. The vibration isolator according to claim 1, wherein the first arm and the second arm each comprises a conical outer surface and an interior that is at least partially hollow; and wherein the first tubeform bearing and the second tubeform bearing each comprises a high capacity laminate elastomeric bearing bonded to the outer surface and a casing bonded to the elastomeric bearing, the casing enclosing the hollow portion of at least one of the first arm and the second arm.

7. The vibration isolator according to claim 1, wherein the housing comprises an upper housing and a lower housing, and wherein the piston assembly is resiliently coupled on a first end to the upper housing with a first elastomeric member and to the lower housing with a second elastomeric member.

8. A rotor pylon assembly, comprising:
   a roof beam having a pylon beam extending upwardly;
   a vibration isolator housing connected to the pylon beam;
   a piston assembly at least partially disposed within the vibration isolator housing, the piston assembly having a first arm and a second arm;
   a first fluid chamber between the vibration isolator housing and a first end of the piston assembly;
   a second fluid chamber between the vibration isolator housing and a second end of the piston assembly;
   a tuning passage for providing fluid communication between the first fluid chamber and the second fluid chamber, the tuning passage defining a longitudinal axis; and
   a first tubeform bearing concentrically bonded to the first arm and a second tubeform bearing concentrically bonded to the second arm, the first arm and the second arm each having a conical profile to provide elastomeric stiffness in the longitudinal direction, thereby providing stiffness to counter drive torque wind-up due to rotor assembly rotational drag and inertia.

9. The rotor pylon assembly according to claim 8, wherein the first arm and the second arm each comprises a conical outer surface and an interior that is at least partially hollow; and wherein the first tubeform bearing and the second tubeform bearing each comprises a high capacity laminate elastomeric bearing bonded to the outer surface and a casing bonded to the elastomeric bearing, the casing enclosing the hollow portion of at least one of the first arm and the second arm.

10. An aircraft, comprising:
    a fuselage;
    a rotor pylon assembly having a pitch axis and a roll axis;
    a vibration isolator housing;
    a piston assembly at least partially disposed within the vibration isolator housing, the piston assembly having a first arm and a second arm oriented substantially perpendicular to the pitch axis;
    a first fluid chamber between the housing and a first end of the piston assembly;
    a second fluid chamber between the housing and a second end of the piston assembly;
    a tuning passage for providing fluid communication between the first fluid chamber and the second fluid chamber, the tuning passage parallel to the pitch axis;
    a fluid disposed within the first fluid chamber and the second fluid chamber;
    a first tubeform bearing concentrically bonded to the first arm and a second tubeform bearing concentrically bonded to the second arm, both the first arm and the second arm have a conical profile such that torsional shearing of the first tubeform bearing and the second tubeform bearing provide stiffness about the roll axis and vertical stiffness of the first tubeform bearing and the second tubeform bearing provide stiffness about the pitch axis without the need for additional pitch restraints; and
    a transmission coupled to the first tubeform bearing and to the second tubeform bearing.

11. The aircraft according to claim 10, wherein the first tubeform bearing and the second tubeform bearing each comprises:
   an elastomeric bearing; and
   a casing bonded to the elastomeric bearing.

12. The aircraft according to claim 10, wherein the first tubeform bearing and the second tubeform bearing each comprises:
   a high capacity laminate elastomeric bearing; and
   a casing bonded to the high capacity laminate elastomeric bearing.

13. The aircraft according to claim 10, wherein the piston assembly is resiliently coupled to the vibration isolator housing with at least one elastomer member.

14. The aircraft according to claim 10, wherein each of the first arm and the second arm is at least partially hollow.

15. The aircraft according to claim 10, wherein the first arm and the second arm each comprises a conical outer surface and an interior that is at least partially hollow; and wherein the first tubeform bearing and the second tubeform bearing each comprises a high capacity laminate elastomeric bearing bonded to the outer surface and a casing bonded to the elastomeric bearing, the casing enclosing the hollow portion of at least one of the first arm and the second arm.

16. The aircraft according to claim 10, wherein the housing comprises an upper housing and a lower housing, and wherein the piston assembly is resiliently coupled on a first end to the upper housing with a first elastomeric member and to the lower housing with a second elastomeric member.

\* \* \* \* \*